United States Patent [19]
Gwaltney

[11] Patent Number: 5,751,432
[45] Date of Patent: May 12, 1998

[54] HIGHLIGHT GLOSS FOR XEROGRAPHIC ENGINE

[75] Inventor: Mark A. Gwaltney, Fairport, N.Y.

[73] Assignee: Xerox Corporation, Stamford, Conn.

[21] Appl. No.: 656,516

[22] Filed: May 31, 1996

[51] Int. Cl.[6] .............. H04N 1/00; G03G 21/00; G03G 13/01; G03G 13/20
[52] U.S. Cl. .............. 358/296; 399/147; 399/296; 399/341; 399/342; 430/47; 430/104; 430/124
[58] Field of Search .............. 358/296, 300; 347/2–4, 22, 23, 29, 33, 101, 102, 105; 399/53, 66, 147, 157, 296, 320, 341, 342; 430/47, 48, 104, 124

[56] References Cited

U.S. PATENT DOCUMENTS

| | | | |
|---|---|---|---|
| 3,901,698 | 8/1975 | Fukushima et al. | 96/1 R |
| 4,064,285 | 12/1977 | Mammino | 427/24 |
| 4,066,802 | 1/1978 | Clemens | 427/24 |
| 5,260,753 | 11/1993 | Haneda et al. | 430/47 X |
| 5,327,201 | 7/1994 | Coleman et al. | 430/124 X |
| 5,337,132 | 8/1994 | Cherian | 430/124 X |
| 5,339,146 | 8/1994 | Aslam et al. | 430/47 X |
| 5,413,840 | 5/1995 | Mizuno | 428/195 |
| 5,441,838 | 8/1995 | Pane | 430/124 X |
| 5,612,777 | 3/1997 | Malhotra | 430/42 X |
| 5,660,962 | 8/1997 | Malhotra et al. | 430/47 X |

FOREIGN PATENT DOCUMENTS

| | | |
|---|---|---|
| 0424093 | 4/1991 | European Pat. Off. . |
| 63-058374 | 3/1988 | Japan . |
| 63-080269 | 4/1988 | Japan . |
| 02140757 | 5/1990 | Japan . |
| 02201452 | 8/1990 | Japan . |
| 90201453 | 8/1990 | Japan . |

OTHER PUBLICATIONS

Pond, Xerox Disclosure Journal, vol. 2, No. 5 p. 17 (Sep./Oct. 1977).

Bares, Xerox Disclosure Journal, vol. 16, No. 1 p. 69 (Jan./Feb. 1991).

*Primary Examiner*—Eric Frahm

[57] ABSTRACT

Apparatus and method for glossing certain areas of a substrate. In particular, highlight images are created by incorporating in some of the images on a substrate a clear polymer material thereby providing them with a larger mass thereby resulting in a higher gloss than those images on the same substrate which do not contain the additional clear polymer.

20 Claims, 2 Drawing Sheets

HIGHLIGHT GLOSS FOR XEROGRAPHIC ENGINE

BACKGROUND OF THE INVENTION

The present invention is directed to the glossing certain areas of an imaged substrate and more particularly to producing high gloss images in combination with images that do not exhibit high gloss. Specifically such images are created by selectively including a clear, toner resin in selected portions of xerographic images.

In the practice of conventional xerography, it is the general procedure to form electrostatic latent images on a xerographic surface by first uniformly charging a charge retentive surface such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

This charge pattern is made visible by developing it with toner by passing the photoreceptor past one or more developer housings. In monochromatic imaging, the toner generally comprises black thermoplastic powder particles which adhere to the charge pattern by electrostatic attraction. The developed image is then fixed to the imaging surface or is transferred to a receiving substrate such as plain paper to which it is fixed by suitable fusing techniques.

Recently, there has been a great deal of effort directed to the development of highlight imaging particularly in the area of highlight color copiers/printers which utilize the xerographic imaging process. Such efforts have resulted in the recent introduction of the Xerox™ 5775™ copier/printer, the Xerox 4900™ and the Fuji Xerox A-Color 635™ machine.

Notwithstanding all the recent development in the area of highlight color printers and copiers there is room for improvement in the method and apparatus for highlighting images on paper and synthetic substrates such as Mylar™ and Teslin™.

Following is a discussion of prior art, incorporated herein by reference, which may bear on the patentability of the present invention. In addition to possibly having some relevance to the question of patentability, these references, together with the detailed description to follow, should provide a better understanding and appreciation of the present invention.

U.S. Pat No. 5,413,840 (Mizuno) discloses a decorative laminated sheet having a sense of being coated and having improved surface hardness, which is produced by laminating a polyester film excellent in transparency on the surface of a semi-rigid thermoplastic resin film supplied with a colored layer or a pattern-printed layer, and then coating a hard coat layer comprising a UV-curable coating on the surface of the polyester film of the resulting laminated film, and a process for producing the same. The invention of the ©132 patent can provide a sheet not only excellent in scratch resistance, specular reflectivity and sharpness of the surface, but having a sense of being deeply coated as well.

U.S. Pat. application Ser. No. 07/828,821 filed on Sept. 31, 1992 discloses a method and apparatus for enhancing color fidelity in a printing process employing an intermediate member wherein a developing unit deposits a colorless and transparent material directly onto an intermediate member before transfer of any color toner images thereto. Alternatively, a developing unit first deposits the colorless and transparent material on a latent image member. The colorless and transparent material is then transferred to the intermediate member before transfer of any color toner images thereto. The colorless and transparent material is uniformly deposited on the latent image member.

U.S. Pat. application Ser. No. 08/583,911 Filed on Jan. 11, 1996 discloses an apparatus and method for creating color images which are coated with a composition including a lightfastness inducing material and a hydrophobic polymeric binder which protects the images from rough handling and degradation from exposure to UV radiation in the light.

Various approaches have been devised to enhance the appearance of a color copy. The following disclosures may be relevant to various aspects of the present invention:

Pond, Xerox Disclosure Journal, Vol. 2, No. 5, p. 17 (September/October 1977), describes depositing a layer of fine colorless toner particles on the electrostatic image of a photoconductor, followed by depositing a second layer of larger color toner particles.

Drappel et al., European Pat. Application. 0424093 (published Apr. 24, 1991; corresponds to pending U.S. Ser. No. 07/422,201 assigned to Xerox Corporation), describes forming a "peel layer" on an imaging device. Latent images are formed and developed on the "peel layer," and the "peel layer" is subsequently simultaneously removed from the imaging member and transferred and affixed to a substrate. The use of a transparent waxy toner is disclosed.

Sako et al., J02201453 (English language abstract; published Aug. 9, 1990), describes developing the electrostatic latent image formed on an image carrier with chromatic toners, then developing the entire surface of an image forming region with colorless, transparent toner.

Sako et al., J02201452 (English language abstract; published Aug. 9, 1990), describes mixing a color toner for making an electrostatic latent image visible with a colorless, transparent toner.

Tagawa et al., J02140757 (English language abstract; published May 30, 1990), describes developing what seems to be color toner images over the entire surface of a transfer member by using a colorless toner containing wax of a low melting point as a release agent.

Hirano et al., J63080269 (English language abstract; published Apr. 11, 1988), describes a developer composed of a color toner and a colorless, transparent toner.

Kawabata, J63058374 (English language abstract; published Mar. 14, 1988), describes an image forming method which develops the surface of the photosensitive body with a colorless, transparent toner.

Bares, Xerox Disclosure Journal, Vol. 16, No.1, p. 69 (January/February 1991), describes applying a transparent (unpigmented) toner as a final finishing step.

Fukushima et al., U.S. Pat. No. 3,901,698 (issued Aug. 26, 1975), describes a method of reversal development using two developers wherein the first developer consists of colorless or white, positively charged, toner particles.

Mammino, U.S. Pat. No. 4,064,285 (issued December 20,1977), describes a method of decalcomania wherein the polymeric "subbing" layer is colorless.

Clemens, U.S. Pat. No. 4,066,802 (issued Jan. 3, 1978), describes a method of decalcomania wherein the interposed polymeric sheet is colorless.

BRIEF SUMMARY OF THE INVENTION

The present invention is directed to glossing selected areas of an imaged substrate and, in particular, to creating xerographic images, portions of which include clear polymer for increasing the mass of the polymer material forming those portions thereby causing them to exhibit high gloss thereby causing them to be highlighted or visibly distinguishable from those portions of the images which do not include additional polymer material and, therefore, do not exhibit high gloss. The images containing a higher mass of polymer material not only exhibit higher gloss, they also exhibit a greater degree of color saturation than image areas which have not been coated with the clear toner. The clear toner may be applied to color toner image areas as well as black image areas. Additionally, the clear toner may be applied to non-imaged areas of the substrate. The imaged substrate may be created using printers as well as copiers.

In carrying out the invention, a fifth developer housing is provided in a color image creation apparatus normally comprising only four developer housings. This additional housing contains a clear polymeric material of the type normally utilized in forming toner images. While the invention will be described hereinafter in connection with a printing apparatus which normally creates color images it will be appreciated that black only images may also be created. For example, black images which have been treated so that they exhibit high gloss in combination with a black background that has not been so treated are also possible. In this situation, the high gloss images are considered selected areas of an entire image which includes the background. Selective image glossing can be effected using either printers or copiers.

The portions of the images to be highlighted are sensed using a gloss sensor or detector which senses the specular reflectance from an original document. Output signals generated by the gloss sensor are used to control the output of a Raster Output Scanner (ROS) for forming additional developable latent electrostatic images on the photoreceptor corresponding to areas of the original exhibiting high gloss. The use of an edit pad for creating highlight images is also contemplated.

DETAILED DESCRIPTION OF THE PREFERRED EMBODIMENT OF THE INVENTION

Figure 1:
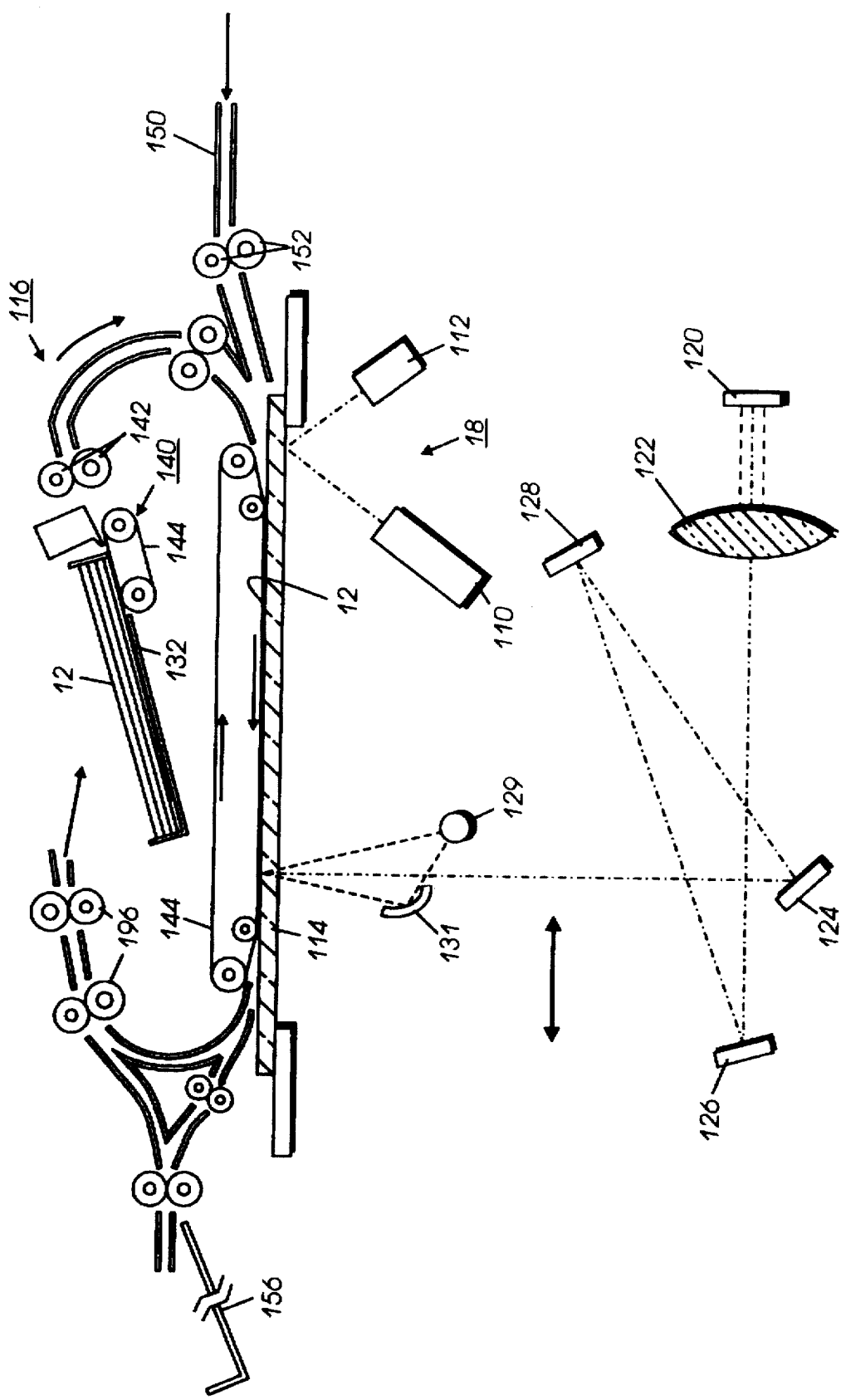
FIG. 1 discloses a schematic representation of a gloss sensor and a Raster Input Scanner (RIS) employed in carrying out the present invention.

While the present invention will hereinafter be described in connection with least one preferred embodiment, it will be understood that it is not intended to limit the invention to that embodiment. On the contrary, it is intended to cover all alternatives, modifications and equivalents as may be included within the spirit and scope of the invention as defined by the appended claims.

For a general understanding of the features of the present invention, reference is made to the drawings. In the drawings, like references have been used throughout to designate identical elements. It will become evident from the following discussion that the present invention is equally well suited for use in a wide variety of printing systems, and is not necessarily limited in its application to the particular system shown herein.

During operation of an image creation apparatus 10 (FIG. 2), a multi-color original document or photograph 12 is positioned on the transparent surface of a Raster Input Scanner (RIS), indicated generally by the reference numeral 14. The RIS contains document illumination lamps, optics, a mechanical scanning drive, and a charge coupled device (CCD array) to be discussed hereinafter. The RIS 14 captures the information contained in the entire original document and converts it to a series of raster scan lines and measures a set of primary color densities, i.e. red, green and blue densities, at each point of the original document. This information is transmitted to an image processing system (IPS), indicated generally by the reference numeral 16. A gloss sensor arrangement 18 (FIG. 1) serves to measure the specular reflectance from the document 12 and generate electrical signals which are transmitted to the IPS 16. IPS 16 contains control electronics which process signals generated by the gloss sensor and RIS to generate image data flow for controlling the activation of a Raster Output Scanner (ROS), indicated generally by the reference numeral 19. Such data flow is derived using one or more algorithms which process the signals from the RIS 14 and gloss sensor 18. As will be appreciated, the gloss sensor is effective to modify the output of the ROS for those areas of the document which exhibit high gloss areas. Alternatively, selected areas of an image can be made to exhibit high gloss via the use of a conventional edit pad 26. By use of the edit pad, selected areas of a document can be delineated for effecting selective highlighting or glossing of the imaged substrate. Output signals form the edit pad are fed to the IPS. Data acquisition, storage, and manipulation involved in controlling the output of the ROS 19 are well within the capabilities of present and future microprocessor-based machine controllers.

A user interface (UI), indicated generally by the reference numeral 20, is operatively connected to IPS 16. UI 20 enables an operator to control various operator adjustable functions. The output signal from UI 20 is transmitted to IPS 16. Signals corresponding to the desired images are transmitted from IPS 16 to the ROS 18, which creates the output image. ROS 19 lays out the image in a series of horizontal scan lines with each line having a specified number of pixels per inch. ROS 19 includes a laser having a conventional rotating polygon mirror block associated therewith. ROS 19 is utilized for exposing, using a mirror 22, a uniformly charged photoconductive belt 24 of a marking engine, indicated generally by the reference numeral 27, to achieve a set of subtractive primary latent images. The latent images are developed with cyan, magenta, and yellow developer material, respectively. These developed images are transferred to a final substrate in superimposed registration with one another to form a multi-color image on the substrate. This multi-color image is then heat and pressure fused to the substrate thereby forming a multi-color toner image thereon.

Figure 2:
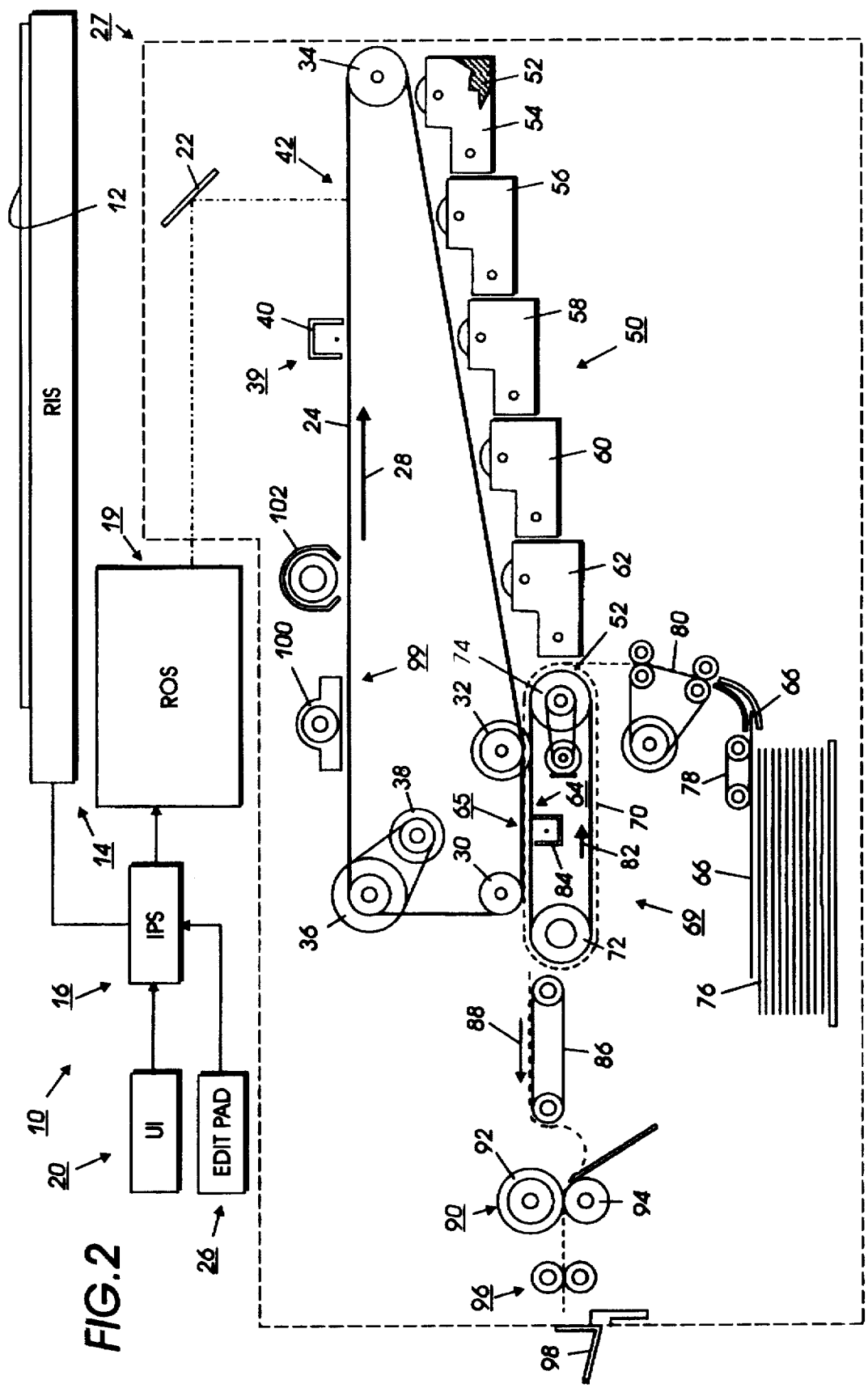
FIG. 2 is a schematic elevational view of an illustrative electrophotographic copier which may be utilized in carrying out the present invention.

With continued reference to the FIG. 2, marking engine 27 serves to create xerographic images using photoconductive belt 24. Photoconductive belt 24 of marking engine 27 is preferably made from a polychromatic photoconductive material. The photoconductive belt moves in the direction of arrow 28 to advance successive portions of the photoconductive surface sequentially through the various processing stations disposed about the path of movement thereof. Photoconductive belt 24 is entrained about transfer rollers 30 and 32, tensioning roller 34, and drive roller 36. Drive roller 36 is rotated by a motor 38 coupled thereto by suitable means such as a belt drive. As roller 36 rotates in the clockwise direction, it advances belt 24 through xerographic process stations in the direction of arrow 28.

Initially, a portion of photoconductive belt 24 passes through a charging station, indicated generally by the reference numeral 39. At charging station 39, a corona generating device 40 charges photoconductive belt 24 to a relatively high, substantially uniform electrostatic potential.

Next, the charged photoconductive surface is moved through an exposure station, indicated generally by the reference numeral 42. Exposure station 42 receives a modulated light beam corresponding to information derived by RIS 14 and gloss sensor 18 by virtue of the multi-color original document 12 being scanned thereby. RIS 14 captures the entire image from the original document 12 and converts it to a series of raster scan lines which are transmitted as electrical signals to IPS 16. The electrical signals from RIS 14 correspond to the red, green and blue densities at each point in the original document. IPS 16 converts the set of red, green and blue density signals, i.e. the set of signals corresponding to the primary color densities of original document 12, to a set of colorimetric coordinates. The operator may actuate the appropriate keys of UI 20 to adjust the parameters of the copy. UI 20 may be a touch screen, or any other suitable control panel, providing an operator interface with the system. The output signals from UI 20 are transmitted to IPS 16. The IPS which also receives signals from either the edit pad 26 or the gloss sensor 18 transmits the resultant data information to ROS 19. ROS 19 includes a laser with a rotating polygon mirror block. Preferably, the polygon mirror block has nine facets is used. ROS 19 illuminates, via mirror 22, the charged portion of photoconductive belt 24 at a rate of about 400 pixels per inch. The ROS will expose the photoconductive belt to record three latent images. One latent image is developed with cyan developer material. Another latent image is developed with magenta developer material and the third latent image is developed with yellow developer material. A fourth latent image is developed with black toner. The latent images formed by ROS 19 on the photoconductive belt correspond to the signals transmitted from IPS 16.

The document 12 may comprise a color photographic print. It will be appreciated that various other documents may be employed without departing from the scope and true spirit of the invention.

After the electrostatic latent images have been recorded on photoconductive belt 24, the belt advances such latent images to a development station, indicated generally by the reference numeral 50. The development station includes five individual developer units indicated by reference numerals 54, 56, 58, 60 and 62. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 56, 58, 60, and 62, respectively, apply toner particles of a specific color which corresponds to a compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 24, while the green areas will be reduced to a voltage level ineffective for development.

Selected areas of charge on the photoconductor corresponding to those areas which are to exhibit high gloss are first developed with clear polymer material 52 similar to the polymer material used in xerographic developers. The clear polymer material 52 is contained in the developer housing 54. While the developer housing 54 is illustrated as being located in the first position relative to the sequential passing of the images on the belt it will be appreciated that it could be positioned elsewhere, for example, in the last position.

Developer unit 56 deposits green absorbing (magenta) toner particles onto the appropriate electrostatic latent images recorded on photoconductive belt 24. Similarly, red separation is developed by developer unit 58 with red absorbing (cyan) toner particles and a blue separation is developed by developer unit 60 with blue absorbing (yellow) toner particles. Developer unit 62 contains black toner particles and may be used to develop the electrostatic latent image formed from a black and white original document or it may be used for under color removal and black image generation as part of multi-color image generation.

The developer mixture containing the clear toner polymer 52 in developer housing 54 also comprises hydrophobic polymeric resin particles and a light fast material together with carrier particles as well as other suitable additives. As noted, the developer unit 54 containing the clear toner polymer may be the first unit, as shown in FIG. 2, to deposit some clear polymer material on the photoreceptor or it may be the last. In either case, the mixture of clear hydrophobic toner resin and light fast material provides image areas which exhibit high gloss characteristics. When the clear polymer is deposited on the photoconductive belt first it will end up on top of the image after transfer to a final substrate thereby not only increasing its gloss properties but protecting the image from UV radiation and from scuffing.

Each of the developer units is moved into and out of an operative position. In the operative position, the magnetic brush is closely adjacent the photoconductive belt, while in the non-operative position, the magnetic brush is spaced therefrom. During development of each electrostatic latent image, only one developer unit is in the operative position, the remaining developer units are in the non-operative position. This ensures that each electrostatic latent image is developed with toner particles of the appropriate color without commingling of toner particles in the carious developer housings.

It will be appreciated by those skilled in the art that scavengeless or non-interactive development systems well known in the art could be used in lieu of magnetic brush developer structures.

After development, the toner image is moved to a transfer station, indicated generally by the reference numeral 64. Transfer station 64 includes a transfer zone, generally indicated by reference numeral 65. In transfer zone 65, the toner image is transferred or deposited onto to a substrate 66. At transfer station 64, a substrate transport apparatus, indicated generally by the reference numeral 69, moves the substrate 66 into contact with photoconductive belt 24. Substrate transport 69 has a pair of spaced belts 70 entrained about a pair of substantially cylindrical rollers 72 and 74. A substrate gripper (not shown) extends between belts 70 and moves in unison therewith. The substrate 66 is advanced from a stack of substrates 76 disposed on a tray. A friction retard feeder 78 advances the uppermost substrate from stack 76 onto a pre-transfer transport 80. Transport 80 advances substrate 66 to substrate transport 69. Substrate 66 is advanced by transport 69 in synchronism with the movement of substrate gripper, not shown. In this way, the leading edge of substrate 66 arrives at a preselected position, i.e. a loading zone for movement therewith in a recirculating path. The leading edge of substrate 66 is secured releasably by the substrate gripper. As belts 70 move in the direction of arrow 82, the substrate moves into contact with the photoconductive belt, in synchronism with the toner image developed thereon. At transfer zone 65, a corona generating device 84 sprays ions onto the backside of the substrate so as to charge the substrate to the proper electrostatic voltage magnitude and polarity for attracting the toner image from photoconductive belt 24 thereto. The substrate remains secured to the substrate gripper so as to move in a recirculating path for the required number of cycles. In this way, a plurality of toner images are transferred to the substrate in superimposed registration with one another to form composite multi-color images on a final substrate.

Referring again to the FIG. 2, one skilled in the art will appreciate that the substrate may move in a recirculating path for five cycles when under color removal and black generation and glossing. Each of the electrostatic latent images recorded on the photoconductive surface is developed with the appropriately colored toner and transferred, in superimposed registration with one another, to the substrate to form a multi-color facsimile of the colored original document. As may be appreciated, the imaging process is not limited to the creation of color images. Thus, high optical density black and white simulated photographic-quality prints may also be created using the process disclosed herein.

After the last transfer operation, the substrate gripper opens and releases the substrate 66. A conveyor 86 transports the substrate, in the direction of arrow 88, to a heat and pressure fusing station, indicated generally by the reference numeral 90, where the transferred toner images are permanently fused to the substrate. The fusing station includes a heated fuser roll 92 and a pressure roll 94. The substrate passes through the nip defined by fuser roll 92 and pressure roll 94. The toner image contacts fuser roll 92 so as to be affixed to the substrate 66. Thereafter, the substrate is advanced by a pair of rolls 96 to an output tray 98.

The next processing station in the direction of movement of belt 24, as indicated by arrow 28, is a cleaning station, indicated generally by the reference numeral 99. A rotatably mounted fibrous brush 100 is positioned in the cleaning station for contact with photoconductive belt 24 to remove residual toner particles remaining after the transfer operation. Thereafter, lamp 102 illuminates photoconductive belt 24 to remove any residual charge remaining thereon prior to the start of the next successive cycle.

Functional components of the gloss sensor 18 and the RIS 14 are schematically illustrated in FIG. 1. As shown therein, the gloss sensor comprises an illumination source 110 and a gloss detector structure in the form of one or more specular reflectance detectors 112 which are supported relative to the multi-color original 12 and a platen 114 such that the illumination from the source 110 impinges on the document as it is moved onto the platen 114 by means of a document handling mechanism 116. The magnitude of the illumination reflected from the document varies as a function of the glossiness of the different areas of the original document. The output from the gloss sensor 112 is transmitted to the IPS and is used thereby as one input for determining the output of the ROS 19. The gloss sensor 18 and the components of the RIS 14 are mounted on a reciprocating carriage (not shown). The original document is scanned by the gloss sensor as it is being moved onto the platen 114. The carriage on which the components of the RIS are supported is then moved relative to the document 12 for scanning the document.

Once the original document comes to rest on the platen 114, the document is scanned by the RIS for generating another input to the IPS for use in controlling the output of the ROS 19. Referring particularly to FIG. 1, scanner or RIS 14 incorporates the transparent platen 114 on which the original document 12 to be scanned is located. One or more linear arrays 120 are supported for reciprocating scanning movement below platen 114. Lens 122 and mirrors 124, 126 and 128 cooperate to focus onto array 122 a line-like segment of reflected light from the document being scanned on platen 114. To this end, an illumination source 129 and mirror 131 are provided. Array 122 provides image signals or pixels representative of the image scanned.

Documents 12 to be scanned may be located on platen 114 for scanning by automatic document handler (ADH) 116 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 116 has a document tray 132 in which documents 12 are arranged in stacks or batches. The documents 12 in tray 132 are advanced by vacuum feed belt 140 and document feed rolls 142 and document feed belt 144 onto platen 114 where the document is scanned by array 120. Following scanning, the document is removed from platen 114 by belt 144 and returned to tray 132 by document feed rolls 146.

For operation in the SADH mode, a document entry slot 150 provides access to the document feed belt 144 between tray 132 and platen 114 through which individual documents may be inserted manually for transport to platen 114. Feed rolls 152 behind slot 150 form a nip for engaging and feeding the document to feed belt 144 and onto platen 114. Following scanning, the document is removed from platen 114 and discharged into catch tray 156.

For operation in the CFF mode, computer forms material is fed through slot 150 and advanced by feed rolls 152 to document feed belt 144 which in turn advances a page of the fanfold material into position on platen 114.

In operation, the portion of the signals from the gloss sensor serve to effect discharge of the photoreceptor in those areas thereof corresponding to areas on the document which exhibit relatively high gloss. These areas are developed with clear toner or polymer material 52 contained in the developer housing 54. As will be appreciated, these same areas will subsequently be developed with colored toner material from one or more of the developer housings 56, 58, 60 and 62. The presence of the clear toner polymer in any given area serves to increase the gloss of that area compared to what it would be in the absence of such clear toner. As will be appreciated, an edit pad could be use in lieu of the gloss sensor for effecting glossing of a developed image. Unlike the glossing of images using the gloss sensor, the use of an edit pad would be capable of delineating larger areas of the original than with the use of the gloss sensor. With the use of the gloss sensor, it is possible to increase the gloss of the developed images in many discrete areas such as those containing letters of the alphabet.

The mixture 52 contained in the developer unit 54 comprises (1) a binder in the form of a clear resin toner which is selected from the group consisting of (A) polyesters; (B) polyvinyl acetals; (C) vinyl alcohol-vinyl acetal copolymers; (D) polycarbonates; and (E) styrene-alkyl alkyl acrylate copolymers and styrene-aryl alkyl acrylate copolymers; (F) styrene-diene copolymers;(G) styrene-maleic anhydride copolymers; (H) styrene-allyl alcohol copolymers; and mixtures thereof; (2) charge control additives such as alkyl pyridinium halides, cetyl pyridinium chloride, cetyl pyridinium tetrafluoroborates, quaternary ammonium sulfate and sulfonate compounds, such as distearyl dimethyl ammonium methyl sulfate; (3) Surface additives such as straight silica, colloidal silica, Unilin, polyethylene waxes, polypropylene waxes, aluminum oxide, stearic acid, polyvinylidene fluoride, and the like; (4) Surfactants such as nonionic surfactants such as polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octyphenyl ether, polyoxyethylene oleyl ether, polyoxyethylene sorbitan monolaurate, polyoxyethylene stearyl ether, polyoxyethylene nonylphenyl ether, and the like; and (5) a light fastness inducing agent such as 1,2-hydroxy-4-(octyloxy) benzophenone, 2-(4-benzoyl-3hydroxyphenoxy) ethylacrylate and the like. Preferably, the binder comprises a polycarbonate in order to provide the toner image with a finish that exhibits excellent abrasion resistance.

Other modifications of the present invention may occur to those skilled in the art subsequent to a review of the present application, and these modifications, including equivalents thereof, are intended to be included within the scope of the present invention.

What is claimed is:

1. Apparatus for creating highlight toner images, said apparatus comprising:

means for forming toner images on an image receiver;

means for effecting combining of clear polymer material with some of said toner images on said image receiver; and means for fusing said toner images and said clear polymer to a final substrate for creating toner images with different degrees of gloss on said final substrate.

2. Apparatus according to claim 1 wherein said effecting means comprises a developer housing containing said clear polymer.

3. Apparatus according to claim 2 wherein said means for effecting incorporation of a clear polymer further comprises a ROS for delineating said selected areas.

4. Apparatus according to claim 3 wherein said image receiving means comprises a charge retentive surface and said apparatus further comprises means for depositing clear polymer thereon prior to images being formed thereon.

5. Apparatus according to claim 4 including means for transferring said toner images to said final substrate prior to fusing thereof.

6. Apparatus according to claim 4 wherein said clear polymer contains a lightfastness inducing material.

7. Apparatus according to claim 6 wherein said lightfastness inducing material is present in said clear polymer in an amount of from about 0.5 percent by weight to about 20 percent by weight.

8. Apparatus according to claim 7 wherein said clear polymer comprises a scratch resistant material.

9. Apparatus according to claim 8 wherein said scratch resistant polymer material comprises a hydrophobic polymer resin such as a polycarbonate, polyamide.

10. Apparatus according to claim 9 wherein said lightfastness inducing material comprises a material selected from the group consisting of 2-(4-benzoyl-3-hydroxyphenoxy) ethylacrylate; 1,2-hydroxy4-(octyloxy) benzophenone; poly[2-(4-benzoyl-3-hydroxyphenoxy) ethylacrylate]; hexadecyl 3,5-di-tert-butyl4-hydroxybenzoate; poly[N,N-bis(2, 2, 6, 6-tetramethyl-4-piperidinyl)-1; 6-hexanediamine-co-2, 4-dichloro-6-morpholino-1, 3, 5-triazine); 2-dodecyl-N-(2, 2, 6, 6-tetramethyl-4-piperidinyl) succinimide; 2-dodecyl-N-(1, 2, 2, 6, 6-pentamethyl-4-piperidinyl) succinimide; N-(1-acetyl-2, 2, 6, 6-tetramethyl-4-piperidinyl)-2-dodecylsuccinimide; 1[N-[poly(3-allyloxy-2-hydroxypropyl)-2-aminoethyl]-2-imidazolidinone; poly(2-ethyl-2-oxazoline).

11. A method for creating highlight toner images, said method including the steps of:

forming toner images on an image receiver;

effecting incorporation of clear polymer material with some of said toner images; and fusing said toner images to a final substrate for creating toner images with different degrees of gloss on said final substrate.

12. The method according to claim 1 wherein said step of effecting incorporation of a clear polymer comprises using ROS for delineating said certain areas.

13. The method according to claim 12 wherein said step of effecting comprises using a developer housing containing said clear polymer.

14. The method according to claim 13 wherein said image receiver comprises a charge retentive surface for receiving toner images and further including the step of selectively depositing clear polymer thereon prior to images being formed thereon.

15. The method according to claim 14 including the step of transferring said toner images to said final substrate prior to fusing thereof.

16. The method according to claim 14 wherein said clear polymer contains a lightfastness inducing material.

17. The method according to claim 16 wherein said lightfastness inducing material is present in said clear polymer in an amount of from about 0.5 percent by weight to about 20 percent by weight.

18. The method according to claim 17 wherein said clear polymer comprises a scratch resistant material.

19. The method according to claim 18 wherein said scratch resistant polymer material comprises a hydrophobic polymer resin such as a polycarbonate, polyamide.

20. The method according to claim 19 wherein said lightfastness inducing material comprises a material selected from the group consisting of 2-(4-benzoyl-3-hydroxyphenoxy) ethylacrylate; 1,2-hydroxy-4-(octyloxy) benzophenone; poly[2-(4-benzoyl-3-hydroxyphenoxy) ethylacrylate]; hexadecyl 3,5-di-tert-butyl-4-hydroxybenzoate; poly[N,N-bis(2, 2, 6, 6-tetramethyl-4-piperidinyl)-1; 6-hexanediamine-co-2, 4-dichloro-6-morpholino-1, 3, 5-triazine); 2-dodecyl-N-(2, 2, 6, 6-tetramethyl-4-piperidinyl) succinimide; 2-dodecyl-N-(1, 2, 2, 6, 6-pentamethyl-4-piperidinyl) succinimide; N-(1-acetyl-2, 2, 6, 6-tetramethyl-4-piperidinyl)-2-dodecylsuccinimide; 1-[N-[poly(3-allyloxy-2-hydroxypropyl)-2-aminoethyl]-2-imidazolidinone; poly(2-ethyl-2-oxazoline).

* * * * *